(12) United States Patent
Yeo et al.

(10) Patent No.: US 11,282,445 B2
(45) Date of Patent: Mar. 22, 2022

(54) DISPLAY DEVICE AND METHOD FOR CONTROLLING SAME

(71) Applicant: SAMSUNG ELECTRONICS CO., LTD., Suwon-si (KR)

(72) Inventors: Yonghoon Yeo, Suwon-si (KR);
Jaehyang Lee, Suwon-si (KR);
Byeongcheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/263,795

(22) PCT Filed: May 31, 2019

(86) PCT No.: PCT/KR2019/006546
§ 371 (c)(1),
(2) Date: Jan. 27, 2021

(87) PCT Pub. No.: WO2020/045800
PCT Pub. Date: Mar. 5, 2020

(65) Prior Publication Data
US 2021/0233464 A1    Jul. 29, 2021

(30) Foreign Application Priority Data

Aug. 31, 2018    (KR) .................. 10-2018-0103842

(51) Int. Cl.
*G09G 3/32*    (2016.01)
(52) U.S. Cl.
CPC .......... *G09G 3/32* (2013.01); *G09G 2330/04* (2013.01); *G09G 2370/04* (2013.01)

(58) Field of Classification Search
CPC ...................................................... G09G 3/32
See application file for complete search history.

(56) References Cited

U.S. PATENT DOCUMENTS 7,417,509 B2    8/2008   Kultgen
9,220,137 B2    12/2015  Fujimura et al.
(Continued)

FOREIGN PATENT DOCUMENTS

JP        7-255003 A       10/1995
KR    10-2007-0063643 A     6/2007
(Continued)

OTHER PUBLICATIONS

International Search Report dated Sep. 11, 2019 issued by the International Searching Authority in International Application No. PCT/KR2019/006546 (PCT/ISA/210).
(Continued)

*Primary Examiner* — Gustavo Polo
(74) *Attorney, Agent, or Firm* — Sughrue Mion, PLLC (57) ABSTRACT

A display device is disclosed. The display device may comprise: a plurality of light emitting diode (LED) modules; a plurality of driving modules for driving the plurality of LED modules; and a controller for sequentially providing the plurality of LED modules with image data corresponding to the plurality of LED modules, and receiving return data corresponding to the image data. The controller may perform a control to receive return data including additional information obtained from the plurality of LED modules and block return data including the image data.

15 Claims, 8 Drawing Sheets

(56) References Cited

U.S. PATENT DOCUMENTS

| | | | |
|---|---|---|---|
| 2006/0007382 A1 | 1/2006 | Sano | |
| 2017/0024612 A1* | 1/2017 | Wexler | H04N 5/2257 |
| 2017/0039952 A1* | 2/2017 | Kim | G09G 3/3233 |
| 2017/0264456 A1 | 9/2017 | Seidel | |
| 2018/0034460 A1 | 2/2018 | Kirchner et al. | |

FOREIGN PATENT DOCUMENTS

| | | |
|---|---|---|
| KR | 10-1028529 B1 | 4/2011 |
| KR | 10-2014-0059627 A | 5/2014 |
| KR | 10-1548351 B1 | 8/2015 |
| KR | 10-2016-0024294 A | 3/2016 |
| KR | 10-1694899 B1 | 1/2017 |
| KR | 10-2018-0068946 A | 6/2018 |

OTHER PUBLICATIONS

International Written Opinion dated Sep. 11, 2019 issued by the International Searching Authority in International Application No. PCT/KR2019/006546 (PCT/ISA/237).
Communication dated Jul. 15, 2021, issued by the European Patent Office in European Application No. 19854642.6.

\* cited by examiner

DISPLAY DEVICE AND METHOD FOR CONTROLLING SAME

TECHNICAL FIELD

The disclosure relates to a display device and a method for controlling the same, and more particularly, to a display device that reduces electro magnetic interference (EMI), and a method for controlling the same.

DESCRIPTION OF THE RELATED ART

For reducing electro magnetic interference (EMI) that occurs in a process wherein a controller provided in a display device transmits image data to an operating driver of a display module, a technology such as spread spectrum is known. However, there is no known technology regarding a technology of reducing EMI of return data that returns from a display module to a controller.

For identifying defect information of an LED device, etc., such return data needs to be received, and as return data includes high speed image data consisting of high frequency components, there is a problem that EMI occurs in a process wherein a controller receives return data.

DETAILED DESCRIPTION OF THE INVENTION

Technical Problem

The disclosure is for addressing the aforementioned need, and the purpose of the disclosure is in providing a display device that reduces EMI noises by controlling a controller to not receive image data included in return data transmitted from a display module, and a method for controlling the same.

Technical Solution

A display device according to an embodiment of the disclosure for achieving the aforementioned purpose may include a plurality of light emitting diode (LED) modules, a plurality of driving modules for driving the plurality of LED modules, and a controller for sequentially providing the plurality of LED modules with image data corresponding to the plurality of LED modules, and receiving return data corresponding to the image data.

The controller may perform a control to receive return data including additional information obtained from the plurality of LED modules, and block return data including the image data.

The display device may further include a switch located on a connecting line between the controller and at least one of the plurality of driving modules.

The controller may turn on the switch during a predetermined time section to receive the return data including the additional information, and turn off the switch during the remaining time section to block return data including the image data.

The controller may include information on a time point of obtaining the additional information in the image data and transmit the image data, and perform a control to turn on the switch during the predetermined time section based on the information.

The controller may include a command to replace at least some of the image data with additional information obtained from the plurality of LED modules in the image data and transmit the image data.

Here, some of the additional information may include information on an LED wherein an event occurred, and the remaining information may be dummy data.

Here, the additional information may include at least one of error information, temperature information, or voltage information of LEDs included in the plurality of LED modules.

The controller may sequentially transmit image data corresponding to each of the plurality of LED modules based on the arrangement order of the plurality of driving modules.

The plurality of LED modules may be modules including a plurality of micro light emitting diodes (LEDs).

Also, a method for controlling a display device according to an embodiment of the disclosure may include the steps of a controller sequentially providing a plurality of light emitting diode (LED) modules with image data corresponding to the plurality of LED modules, and the controller receiving return data corresponding to the image data from one of the plurality of LED modules.

In the step of receiving return data, return data including additional information obtained from the plurality of LED modules may be received, and return data including the image data may be blocked.

In the step of receiving return data, a switch arranged on a line wherein the return data is transmitted may be turned on during a predetermined time section to receive the return data including the additional information, and the switch may be turned off during the remaining time section to block return data including the image data.

In the step of providing, information on a time point of obtaining the additional information may be included in the image data and the image data may be transmitted.

In the step of receiving return data, a control may be performed to turn on the switch during the predetermined time section based on the information.

In the step of providing, a command to replace at least some of the image data with additional information obtained from the plurality of LED modules may be included in the image data and the image data may be transmitted.

Some of the additional information may include information on an LED wherein an event occurred and the remaining information may be dummy data.

The additional information may include at least one of error information, temperature information, or voltage information of LEDs included in the plurality of LED modules.

In the step of providing, a plurality of image data corresponding to each of the plurality of LED modules may be sequentially transmitted based on the arrangement order of the plurality of driving modules.

Here, the plurality of LED modules may be modules including a plurality of micro light emitting diodes (LEDs).

In a non-transitory computer-readable medium storing computer instructions for making a display device according to an embodiment of the disclosure perform operations in case the instructions are executed by a processor of the display device, the operations may include the steps of a controller sequentially providing a plurality of light emitting diode (LED) modules with image data corresponding to the plurality of LED modules, and the controller receiving return data corresponding to the image data.

In the step of receiving return data, return data including additional information obtained from the plurality of LED modules may be received, and return data including the image data may be blocked.

Effect of the Invention

According to the various embodiments of the disclosure as described above, in a process wherein a display module transmits return data to a controller, the controller receives data consisting of low frequency components as it does not receive image data included in the return data, and accordingly, EMI noises can be reduced.

BEST MODE FOR IMPLEMENTING THE INVENTION

Mode for Implementing the Invention

Hereinafter, the disclosure will be described in detail with reference to the accompanying drawings.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in particular cases, there are terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

In addition, terms such as "first," "second" and the like may be used to describe various elements, but the terms are not intended to limit the elements. Such terms are used only to distinguish one element from another element.

Also, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, the expression "at least one of A and/or B" should be interpreted to mean any one of "A" or" B" or "A and B."

In addition, in the disclosure, "a module" or "a part" performs at least one function or operation, and it may be implemented as hardware or software, or as a combination of hardware and software. Also, a plurality of "modules" or "parts" may be integrated into at least one module and implemented as at least one processor (not shown), except "modules" or "parts" which need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, an embodiment of the disclosure will be described in more detail with reference to the accompanying drawings.

Figure 1:
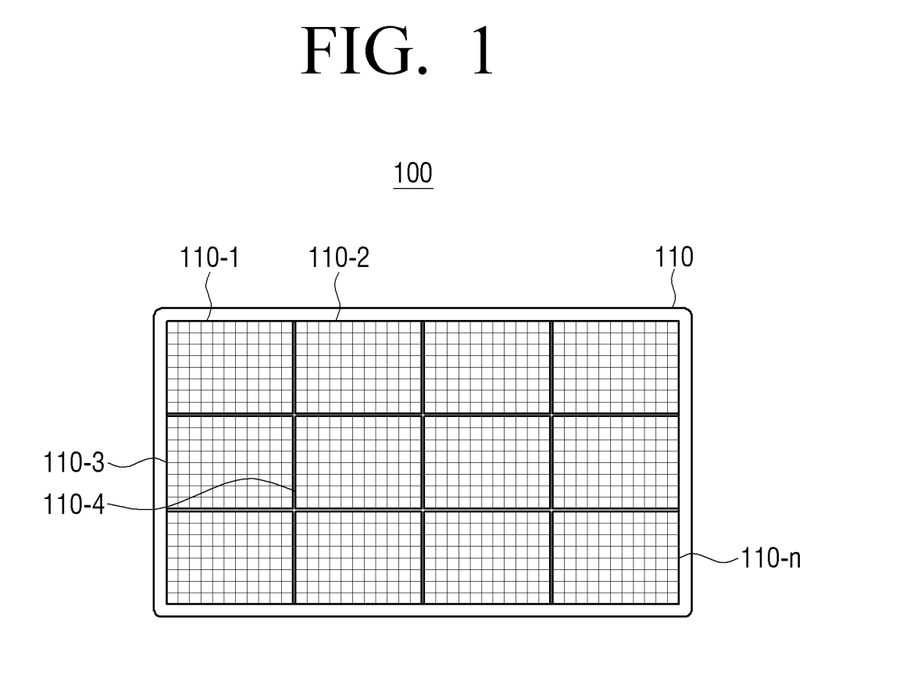
FIG. 1 is a diagram for schematically illustrating a configuration of a display device according to an embodiment of the disclosure.

FIG. 1 is a diagram for schematically illustrating a configuration of a display device according to an embodiment of the disclosure.

According to what is illustrated in FIG. 1, the display device 100 according to an embodiment of the disclosure may be implemented in a form wherein a plurality of light emitting diode (LED) modules 110-1, 110-2, 110-3, 110-4 . . . are physically connected. Here, each of the plurality of LED modules 110-1, 110-2, 110-3, 110-4 . . . may include several pixels arranged in a form of a matrix. In particular, each of the plurality of LED modules 110-1, 110-2, 110-3, 110-4 . . . may include a plurality of LEDs. Here, the LED modules may be implemented as LEDs, micro LEDs, organic LEDs (OLED), active-matrix OLED (AMOLED), etc.

As illustrated in FIG. 1, the plurality of LED modules 110-1, 110-2, 110-3, 110-4 . . . may be physically connected and form one display module 110. Hereinafter, one display module 110 wherein the plurality of LED modules 110-1, 110-2, 110-3, 110-4 . . . are connected as above will be referred to as a display module or an LED cabinet.

In order for the display device 100 to display an image, a controller (not shown) provided in the display device may transmit image data to a display driving module (not shown) driving each of the plurality of LED modules 110-1, 110-2, 110-3, 110-4 . . . , and receive return data corresponding to the image data, and as return data includes high speed image data consisting of high frequency components, EMI occurs when the controller receives return data. Meanwhile, as defect information of LEDs, etc. can be identified through return data, return data needs to be received, and hereinafter, various embodiments of reducing EMI that occurs in a process of receiving return data will be described in detail with reference to the drawings.

Figure 2:
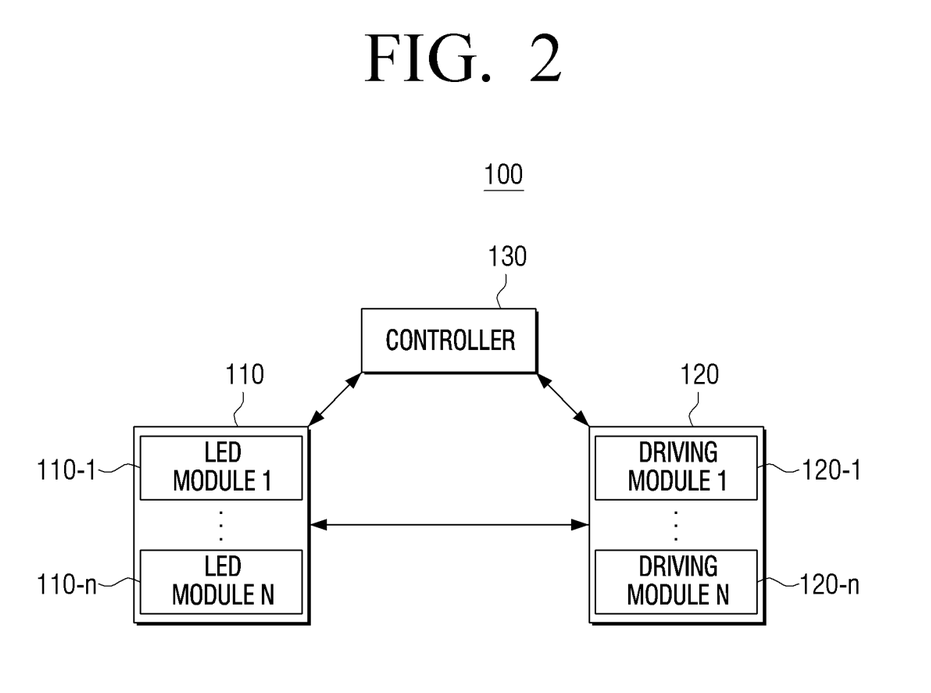
FIG. 2 is a block diagram illustrating a configuration of a display device according to an embodiment of the disclosure.

FIG. 2 is a block diagram illustrating a configuration of a display device according to an embodiment of the disclosure.

According to FIG. 2, the display device 100 includes a display module 110, a display driving part 120, and a controller 130.

The display module 110 may include a plurality of LED modules 110-1, ..., 110-n. Here, each of the plurality of LED modules 110-1, ..., 110-n may include several pixels arranged in a form of a matrix. In particular, each of the plurality of LED modules 110-1, ..., 110-n may be a module including a plurality of LEDs, and according to an embodiment of the disclosure, an LED may be implemented as an RGB LED, and the RGB LED may include a RED LED, a GREEN LED, and a BLUE LED together. Also, an LED may be implemented as a micro LED. Here, a micro LED is an LED in a size of about 5 to 100 micrometers, and it is a micro light emitting diode that emits light by itself without a color filter.

Each of the plurality of LED modules 110-1, ..., 110-n may copy image data received from the controller 130 and store the image data in an internal buffer, and then output the image data, and the image data may return to the controller 130 via the plurality of LED modules 110-1, ..., 110-n.

The display driving part 120 drives the display module 110 according to control of the controller 130. For example, the display driving part 120 applies a driving voltage or makes a driving current flow for driving each self emission diode constituting the display module 110, e.g., each LED pixel according to control of the controller 130, and thereby drives each LED pixel.

The display driving part 120 includes a plurality of LED driving modules 120-1, ..., 120-n connected to the display module 110. The plurality of LED driving modules 120-1, ..., 120-n may transmit image data received from the controller 130 to each LED module, and display an image corresponding to the image data on the display screen. Here, each of the plurality of LED driving modules 120-1, ..., 120-n may be implemented as an LED driver.

Also, the plurality of LED driving modules 120-1, ..., 120-n provide driving currents to the display module 110 to correspond to each control signal input from the controller 130, and thereby drive the display module 110. Specifically, the plurality of LED driving modules 120-1, ..., 120-n may adjust the time or strength, etc. of provision of driving currents provided to the display module 110 to correspond to each control signal input from the controller 130, and output the driving currents.

Each of the plurality of LED driving modules 120-1, ..., 120-n may include a power supply for supplying power. A power supply is hardware that supplies power to fit each system by converting an alternating current to a direct current so that the current can be used stably in the display module 110. A power supply may roughly consist of an input electromagnetic wave obstacle filtering part, an alternating current-direct current rectifying part, a direct current-direct current switching conversion part, an output filter, and an output part.

Here, the power supply may be implemented as, for example, a switched mode power supply (SMPS). An SMPS is a direct current stabilizing power device of which output was stabilized by controlling an on-off time ratio of a semiconductor switch element, and for which high efficiency, miniaturization, and lightening are possible, and thus it can be used in driving the display module 110.

Meanwhile, according to another embodiment of the disclosure, the display driving part 120 may be implemented in a form of one driving module that separately drives a plurality of SMPSs that supply power to the display module 110.

The controller 130 controls the overall operations of transmitting image data to the display modules 110, and receiving return data discharged from one of the display modules 110.

The controller 130 according to an embodiment of the disclosure may be implemented as a time controller (TCON) that receives an input image signal and transmits the signal to the plurality of LED driving modules 120-1, ..., 120-n. The controller 130 may apply a driving voltage or make a driving current flow for driving LED pixels constituting the LED modules by controlling each of the plurality of LED driving modules 120-1, ..., 120-n connected to the plurality of LED modules 110-1, ..., 110-n, and thereby drive each LED pixel.

The controller 130 may obtain a plurality of image data corresponding to the plurality of LED modules 110-1, ..., 110-n based on an input image signal. Here, an input image signal may be a signal regarding input image information. For example, in case the display device 100 is implemented as a cabinet wherein the plurality of LED modules 110-1, ..., 110-n are connected, an input image signal may be received from an external processor (not shown). Alternatively, in case the display device 100 is implemented as a TV, an input image signal may be received from the processor (not shown), i.e., the main CPU.

The controller 130 may transmit the obtained image data to the plurality of LED modules 110-1, ..., 110-n. Here, the image data is a signal including data for an image to be displayed on the display device 100. The image data may include, for example, the pixel value, luminance information, etc. of each LED.

The controller 130 may sequentially provide the plurality of LED modules 110-1, ..., 110-n with image data corresponding to the plurality of LED modules 110-1, ..., 110-n. Afterwards, the controller 130 may receive return data corresponding to the image data. Here, the return data may include the image data that the controller 130 transmitted to the plurality of LED modules 110-1, ..., 110-n, additional information obtained from the plurality of LED modules 110-1, ..., 110-n, etc. The additional information may include at least one of the error information, the temperature information, or the voltage information of the LEDs included in the plurality of LED modules 110-1, ..., 110-n.

The operations of the controller 130 of transmitting image data to the plurality of LED modules 110-1, ..., 110-n and receiving return data corresponding to the image data will be described with reference to FIG. 3.

Figure 3:
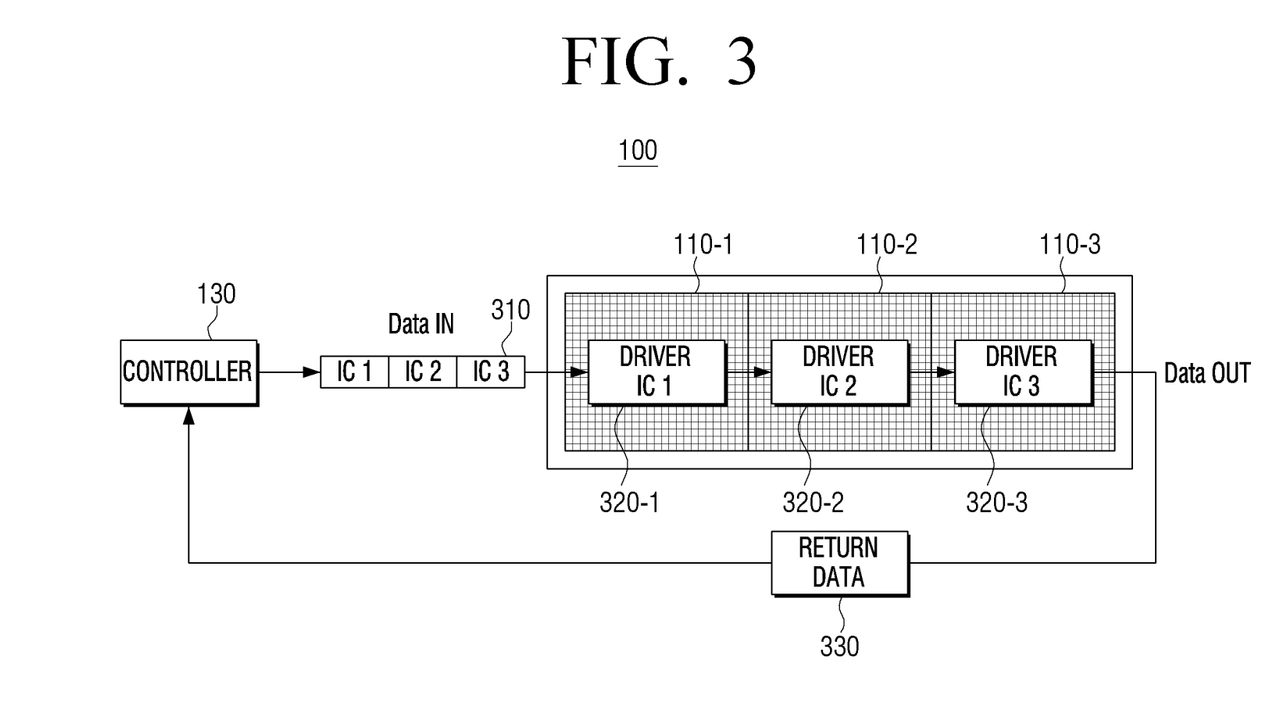
FIG. 3 is a diagram for illustrating return data according to an embodiment of the disclosure.

FIG. 3 is a diagram for illustrating return data according to an embodiment of the disclosure.

In FIG. 3, explanation will be made based on the assumption of a case wherein three LED modules 110-1, 110-2, 110-3 form the display module 110, and LED driving modules 320-1, 320-2, 320-3 connected to the LED modules 110-1, 110-2, 110-3 are implemented as driver integrated circuits (ICs).

The controller 130 may sequentially transmit image data 310 to each of the three corresponding LED driving modules

320-1, 320-2, 320-3 based on the arrangement order of the three LED driving modules 320-1, 320-2, 320-3.

Here, the image data corresponding to the driver IC 1 (320-1) will be described as IC 1 data, the image data corresponding to the driver IC 2 (320-2) will be described as IC 2 data, and the image data corresponding to the driver IC 3 (320-3) will be described as IC 3 data.

The LED driving modules 320-1, 320-2, 320-3 are arranged in the order of the driver IC 1 (320-1), the driver IC 2 (320-2), and the driver IC 3 (320-3). Accordingly, the controller 130 may transmit the IC 3 data first, transmit the IC 2 data secondly, and transmit the IC 3 data lastly, based on such an arrangement. The image data 310 may be input to each LED driving module 320-1, 320-2, 320-3 through the driver IC 1 (320-1) arranged in the first order. Accordingly, each image data 310 may reach the corresponding driver ICs 320-1, 320-2, 320-3 together.

Each of the plurality of LED modules 110-1, . . . , 110-n may copy the image data 310 and store the image data in an internal buffer, and then output the image data, and the image data 310 may be discharged through the third LED module 110-3 arranged in the terminal part among the LED modules 110-1, 110-2, 110-3. The return data 330 including the discharged image data 310 may be transmitted to the controller 130, and according to various embodiments of the disclosure, the controller 130 may not receive the image data 310 included in the return data 330.

As the image data 310 consists of high frequency components, EMI may occur in the process wherein the controller 130 receives the image data 310. Thus, for reducing such EMI, the controller 130 does not receive the image data 310 included in the return data 330.

Returning to FIG. 2, the return data may include image data and additional information, etc., as described above, and the controller 130 may perform a control to receive return data including additional information, and block return data including image data.

According to an embodiment of the disclosure, the controller 130 may turn on a switch (not shown) during a predetermined time section and receive return data including additional information. Here, the switch may be located on a connecting line between at least one of the plurality of driving modules 120-1, . . . , 120-n and the controller 130. That is, the switch may be located on a line wherein return data is transmitted. Meanwhile, a switch on means a state wherein the switch is closed and electric currents flow.

Specifically, the controller 130 may include information on a time point of obtaining additional information in the image data and transmit the image data, and perform a control such that the switch is turned on during a predetermined time section based on such information.

Also, the controller 130 may turn off the switch during the remaining time section and block return data including the image data.

Here, a switch off means a state wherein the switch is opened and electric currents do not flow.

An embodiment of selectively receiving return data by using the switch will be described in detail with reference to FIG. 4.

Figure 4:
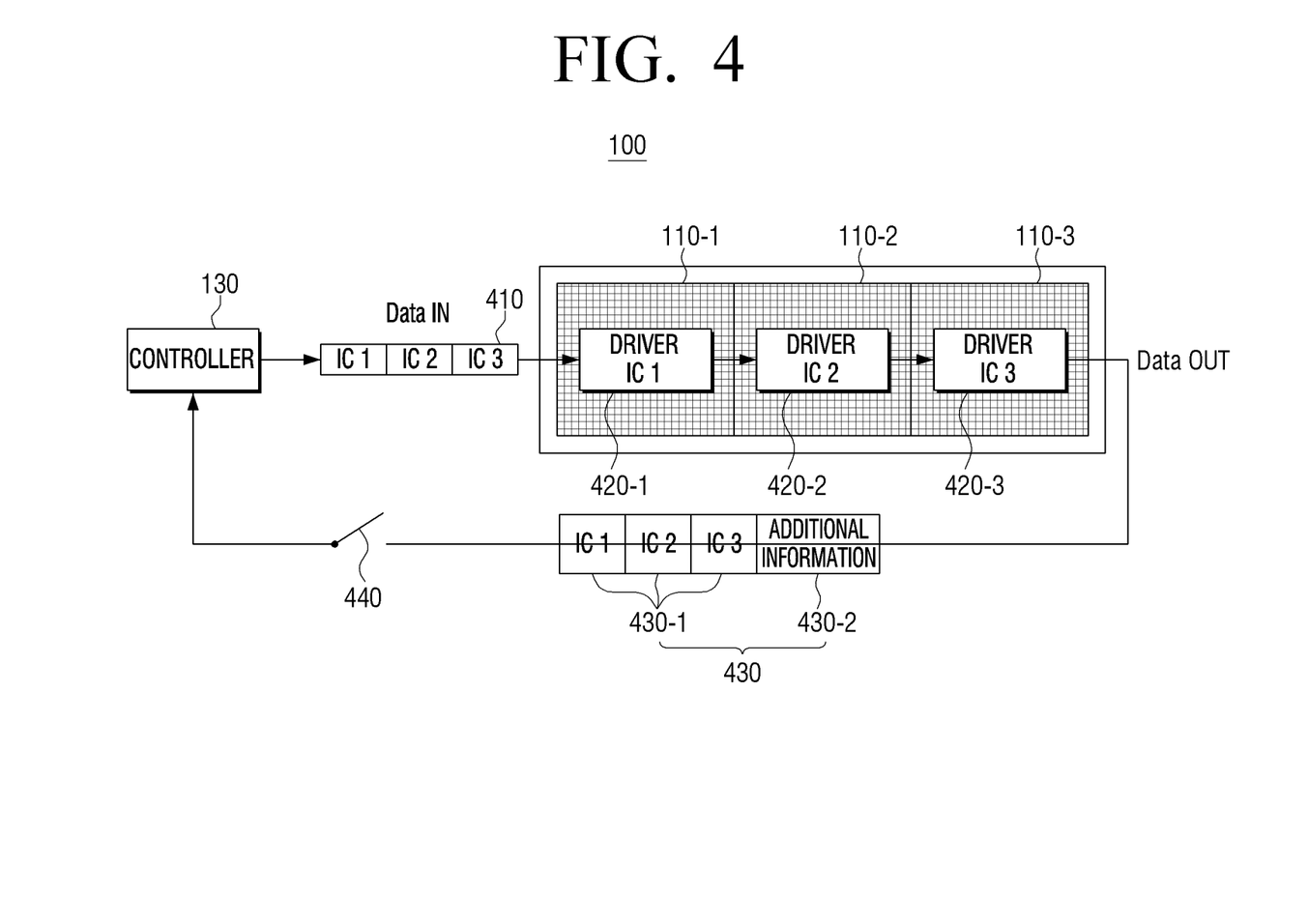
FIG. 4 is a diagram for illustrating an operation of selectively receiving return data by using a switch according to an embodiment of the disclosure.

FIG. 4 is a diagram for illustrating an operation of selectively receiving return data by using a switch according to an embodiment of the disclosure.

As in FIG. 3, explanation will be made based on the assumption of a case wherein the three LED modules 110-1, 110-2, 110-3 form the display module 110, and LED driving modules 420-1, 420-2, 420-3 connected to the LED modules 110-1, 110-2, 110-3 are implemented as driver ICs.

The controller 130 may transmit image data 410 to each of the three LED driving modules 420-1, 420-2, 420-3 in the order of the image data corresponding to the driver IC 3 (420-3) as IC 3 data, the image data corresponding to the driver IC 2 (420-2) as IC 2 data, and the image data corresponding to the driver IC 1 (420-1) as IC 1 data based on the arrangement order of the three LED driving modules 420-1, 420-2, 420-3. After each image data 410 reached the corresponding driver ICs 420-1, 420-2, 420-3 together, the image data 410 may be copied and stored in the internal buffers of each of the LED modules 110-1, 110-2, 110-3, and the image data 410 may be discharged through the third LED module 110-3 arranged in the terminal part.

Afterwards, additional information obtained from the plurality of LED modules 110-1, 110-2, 110-3 may also be discharged through the third LED module 110-3 arranged in the terminal part. That is, additional information may be discharged through the same line as the line through which the image data 410 was discharged. Accordingly, the image data 430-1 may be transmitted to the controller 130 as the return data 430, and then the additional information 430-2 may also be transmitted to the controller 130.

Meanwhile, the controller 130 may turn on the switch 440 during a predetermined time section and receive the return data 430-2 including the additional information, and turn off the switch 440 during the remaining time section and block the return data 430-1 including the image data.

Specifically, the controller 130 may include information on a time point of obtaining the additional information in the image data 410, and after the image data 410 is discharged through the third LED module 110-3 arranged in the terminal part, the additional information obtained from the plurality of LED modules 110-1, 110-2, 110-3 may be discharged at a specific time point. Accordingly, the controller 130 may identify a section of the return data including the additional information, and in this case, the controller 130 may turn on the switch and receive the return data 430-2 including the additional information.

For example, in case the time point of obtaining the additional information is set as after 10 μs from the time when the image data 410 was discharged through the third LED module 110-3, the controller 130 may include information on such a time point of obtaining in the image data 410 and transmit the data to the three LED modules 420-1, 420-2, 420-3. Accordingly, after 10 μs from the time when the image data 410 was discharged through the third LED module 110-3, additional information may be obtained from each of the three LED modules 420-1, 420-2, 420-3, and the obtained additional information may be discharged through the third LED module 110-3. In this case, as there is an interval of 10 μs between the section of the return data 430-1 including the image data and the section of the return data 430-2 including the additional information, the controller 130 may turn on the switch 440 during a predetermined time section after 10 μs from the time when the terminal part of the IC 1 data transmitted lastly among the return data 430-1 including the image data reached the switch 440, and receive the return data 430-2 including the additional information.

Meanwhile, the predetermined time during which the switch 440 becomes a turned-on state may be obtained based on the size of the additional information. For example, in case the size of the additional information is big, the section of the return data including the additional information may also become big, and thus the predetermined time may be increased compared to a case wherein the size of the additional information is small.

The section of the return data 430-2 including the additional information may consist of low frequency components. For example, additional information corresponding to each LED module may be implemented as a plurality of bits indicating the error state of each of the plurality of LEDs included in the LED module. In this case, as only some information corresponding to LEDs having an error has the value of '1,' and the other has the value of '0,' the additional information may mostly consist of the value of '0.' That is, some of the additional information may include information on LEDs wherein an event such as an error occurred, and the other may be dummy data having the value of '0.' Here, as a section corresponding to dummy data is a blank section, additional information including dummy data may consist of low frequency components.

The controller 130 may turn on the switch in the section of the return data 430-2 including additional information consisting of low frequency components, and turn off the switch in the section of the return data 430-1 including image data consisting of high frequency components and block receipt of return data, and thereby reduce EMI that occurs in the process of receiving return data.

The aforementioned embodiment of selectively receiving return data according to FIG. 4 added a switch to the display device 100, and it is a method of reducing EMI in terms of hardware.

Returning to FIG. 2, according to another embodiment of the disclosure, the controller 130 may receive return data wherein at least some of image data, to be specific, a substantial part of image data was substituted (or replaced) with dummy data.

For example, the controller 130 may include a command for replacing image data with additional information obtained from the plurality of LED modules 110-1, . . . , 110-n in the image data and transmit the image data. Specifically, the controller 130 may include a command for replacing at least some of return data including image data with additional information in the image data and transmit the image data to the plurality of LED modules 110-1, . . . , 110-n. Each of the plurality of LED modules 110-1, . . . , 110-n copies the image data and stores the image data in an internal buffer, and then uses the image data for outputting, and the image data returns to the controller via the plurality of LED modules 110-1, . . . , 110-n, and in this process, in each of the plurality of LED modules 110-1, . . . , 110-n, a substantial part of return data including image data may be replaced with additional information. Meanwhile, a command may not be included in image data, but an IC chip included in each of the plurality of LED modules 110-1, . . . , 110-n may be implemented to perform the corresponding operation (e.g., a command, a program, etc. may be stored).

As described above, additional information may mostly consist of dummy data, and thus EMI that occurs in the process wherein the controller 130 receives return data may be reduced.

The operation wherein at least some of image data is replaced with additional information and is transmitted to the controller 130 will be described in detail with reference to FIG. 5.

Figure 5:
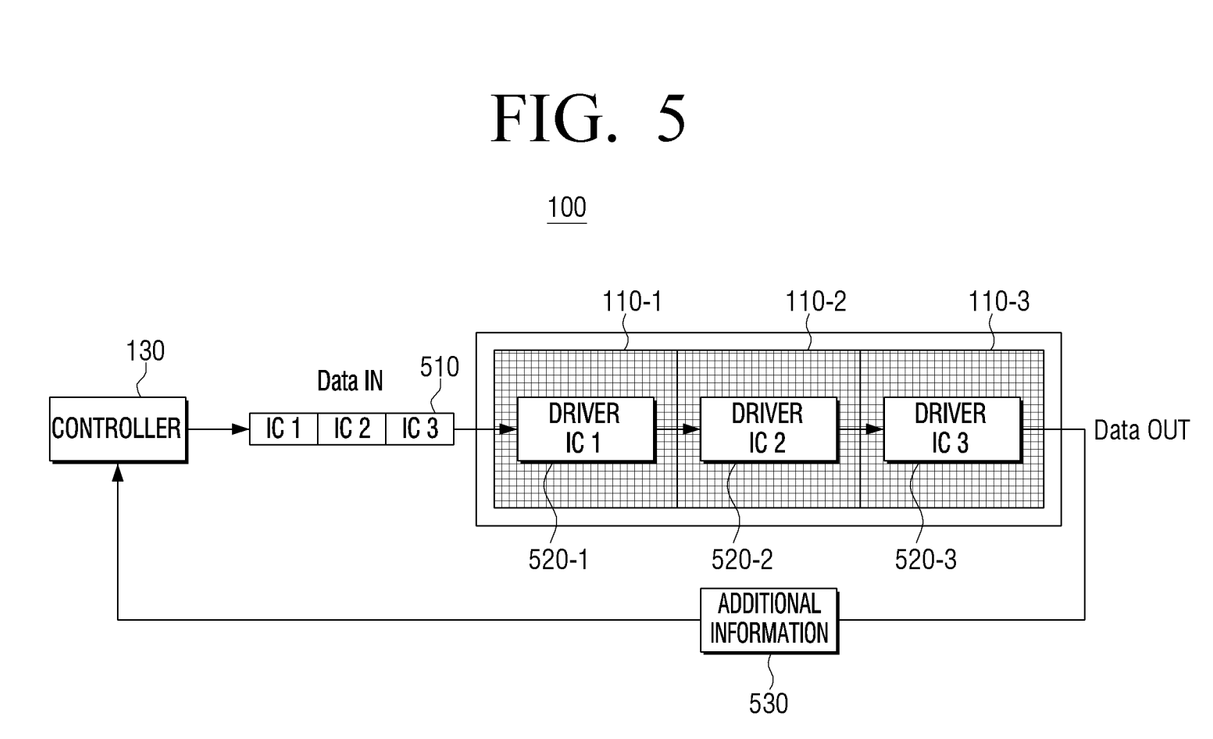
FIG. 5 is a diagram for illustrating an operation of receiving return data wherein at least some of image data was replaced with additional information according to an embodiment of the disclosure.

FIG. 5 is a diagram for illustrating an operation of receiving return data wherein at least some of image data was replaced with additional information according to an embodiment of the disclosure.

As in FIG. 3, explanation will be made based on the assumption of a case wherein the three LED modules 110-1, 110-2, 110-3 form the display module 110, and LED driving modules 520-1, 520-2, 520-3 connected to the LED modules 110-1, 110-2, 110-3 are implemented as driver ICs.

The controller 130 may transmit image data 510 to each of the three LED driving modules 520-1, 520-2, 520-3 in the order of the image data corresponding to the driver IC 3 (520-3) as IC 3 data, the image data corresponding to the driver IC 2 (520-2) as IC 2 data, and the image data corresponding to the driver IC 1 (520-1) as IC 1 data based on the arrangement order of the three LED driving modules 520-1, 520-2, 520-3. Also, the controller 130 may include a command for replacing at least some of the image data 510 with additional information in the image data 510, and transmit the image data 510.

After each image data 510 reached the corresponding driver ICs 520-1, 520-2, 520-3 together, the image data 510 may be copied and stored in the internal buffers of each of the LED modules 110-1, 110-2, 110-3. Then, based on the command included in the image data 510, at least some of the image data 510 may be replaced with additional information, and the data including the replaced additional information may be discharged through the third LED module 110-3 arranged in the terminal part.

Afterwards, the controller 130 may receive return data including the additional information 530 that replaced the image data 510. In such return data, the image data 510 is not included, or only some of the image data 510 is included, and thus EMI that occurs in the process wherein the controller 130 receives return data may be reduced.

Meanwhile, the disclosure is not limited thereto, and after the image data 510 was discharged through the third LED module 110-3 arranged in the terminal part, at least some of the image data 510 may be replaced with the additional information 530 based on the command.

The embodiment of receiving return data consisting of low frequency components according to FIG. 5 is replacing at least some of image data with additional information based on a command, and it is a method of reducing EMI in terms of software. It is a method that can reduce EMI without adding separate hardware components such as a switch, etc. to the display device 100.

Figure 6:
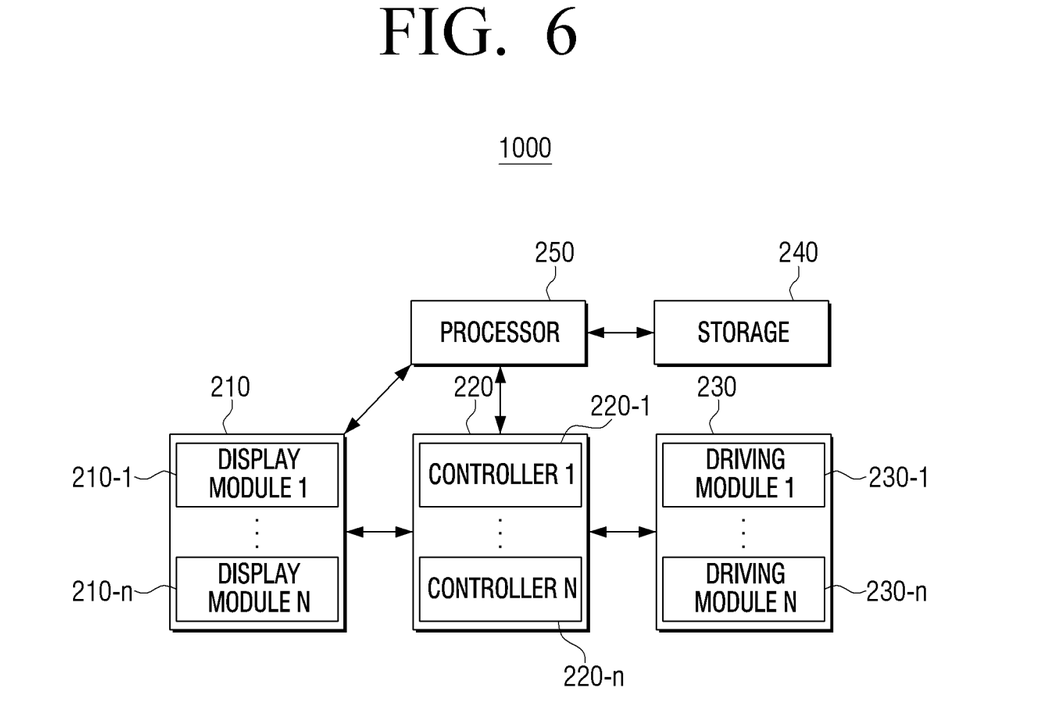
FIG. 6 is a block diagram illustrating an example of a detailed configuration of the display device in FIG. 2.

FIG. 6 is a block diagram illustrating an example of a detailed configuration of the display device in FIG. 2.

Here, the display device is a component including the display module 110, the display driving part 120, and the controller 130, and including the storage 240 and the processor 250 controlling the overall operations of the display device in FIG. 2, and is a concept including the display device in FIG. 2. For convenience of explanation, hereinafter, the display device in FIG. 6 will be generally referred to as a display system.

According to FIG. 6, the display system 1000 includes a plurality of display modules 210, a plurality of controllers 220, a display driving part 230, a storage 240, and a processor 250. Among the components illustrated in FIG. 6, regarding parts that overlap with the components illustrated in FIG. 2, detailed explanation will be omitted.

The plurality of display modules 210 may be in a form wherein several display modules formed as a plurality of LED modules are connected. That is, the plurality of display modules 210 may be in a form of including a plurality of cabinets.

Such a display device including a plurality of display modules 210 may be implemented as a large format display (LFD), etc., and may be used as an outdoor display device such as electronic signage.

The plurality of controllers 220 are components connected to the plurality of display modules 210, and they may transmit image signals to each LED module. Specifically, the plurality of controllers 220 may transmit image data corresponding to each LED module to the driving modules 230-1, . . . , 230-n of each LED module.

Each of the plurality of controllers 220-1, . . . , 220-n may exist for each of the display modules 210-1, . . . , 210-n.

Each of the plurality of controllers 220 may obtain image data corresponding to the plurality of LED modules 110-1, . . . , 110-n included in the corresponding display modules 210-1, . . . , 210-n based on a signal received from the processor 250, and transmit the image data to the corresponding LED modules.

The storage 240 stores various data necessary for the operations of the display system 1000.

The storage 240 may be implemented as a non-volatile memory, a volatile memory, a hard disc drive (HDD) or a solid state drive (SSD), a memory card mounted on the display system 1000 (e.g., a micro SD card, a USB memory, etc.), an external memory that can be connected to an external input port (e.g., a USB memory, etc.).

The storage 240 may store input signals to be transmitted to each LED module 110-1, . . . , 110-n. Specifically, input signals stored in the storage 240 may be transmitted to each of the plurality of controllers 220 according to control of the processor 250.

The processor 250 controls the overall operations of the display system 1000.

Here, the processor 250 may include one or more of a central processing unit (CPU), a controller, an application processor (AP), or a communication processor (CP), and an ARM processor.

Also, the processor 250 may include a graphic processing unit (not shown) for graphic processing corresponding to an image. The processor 250 may be implemented as a System On Chip (SoC) including a core (not shown) and a GPU (not shown). The processor 250 may include a single core, a dual core, a triple core, a quad core, and a core of a multiple number thereof.

The processor 250 according to an embodiment of the disclosure may process input signals and obtain signals corresponding to each of the plurality of display modules 210, and provide the obtained signals to the plurality of controllers 220.

Afterwards, the processor 250 may control the display driving part 230 and display an image corresponding to a signal on the display screen.

Figure 7:
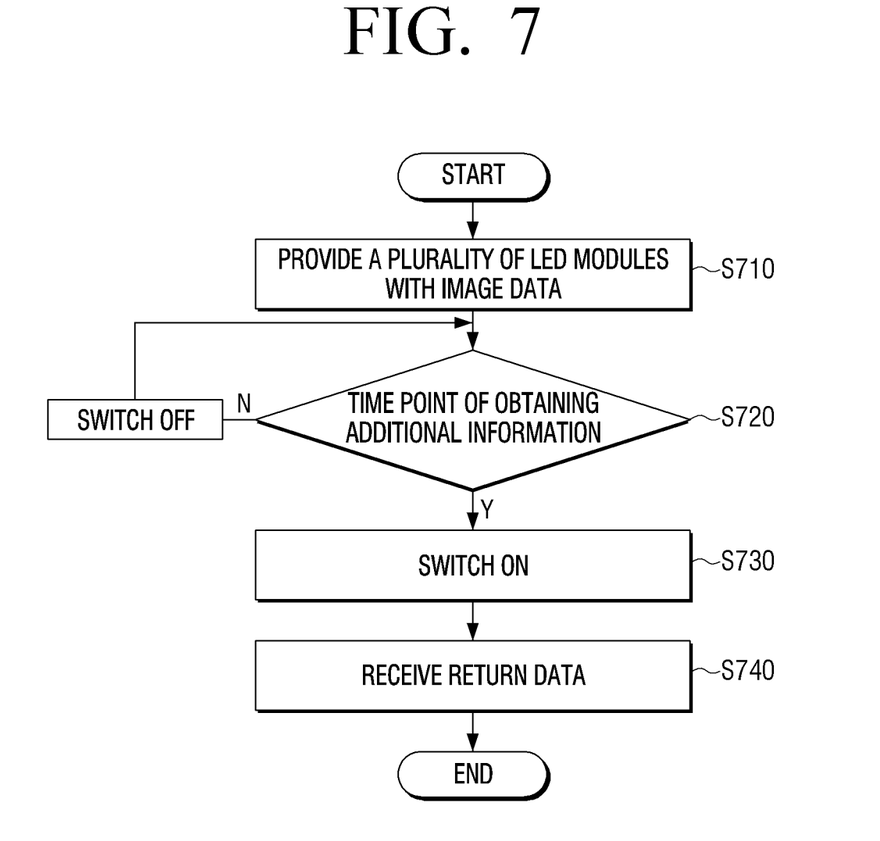
FIG. 7 is a diagram for illustrating a flow chart of receiving return data based on a switch according to an embodiment of the disclosure.

FIG. 7 is a diagram for illustrating a flow chart of receiving return data based on a switch according to an embodiment of the disclosure.

The controller 130 may sequentially provide a plurality of LED modules with image data corresponding to the plurality of LED modules at operation S710. Here, the image data is a signal including data for an image to be displayed on the display device 100. The image data may include, for example, the pixel value, luminance information, etc. of each LED.

After each image data reached the corresponding LED driving module, the image data may be copied and stored in the internal buffer of each LED module, and the image data may be discharged through one of the plurality of LED modules.

Afterwards, additional information obtained from the plurality of LED modules 110-1, 110-2, 110-3 may also be discharged through one of the plurality of LED modules. That is, additional information may be discharged through the same line as the line through which the image data was discharged. Accordingly, return data transmitted to the controller 130 may include the image data and the additional information. Here, the additional information may include at least one of the error information, the temperature information, or the voltage information of the LEDs included in the plurality of LED modules.

When a time point of obtaining additional information is reached at operation S720-Y, the controller 130 may turn on the switch at operation S730. As the controller 130 includes information on the time point of obtaining additional information in the image data and transmits the image data, the time point when the additional information passes through the switch can be identified.

When a time point of obtaining additional information is reached, the controller 130 may turn on the switch during a predetermined time section and receive return data including the additional information at operation S740. Also, the controller 130 may turn off the switch in a section which is not the time point of obtaining additional information at operation S720-N, and block return data including the image data.

Figure 8:
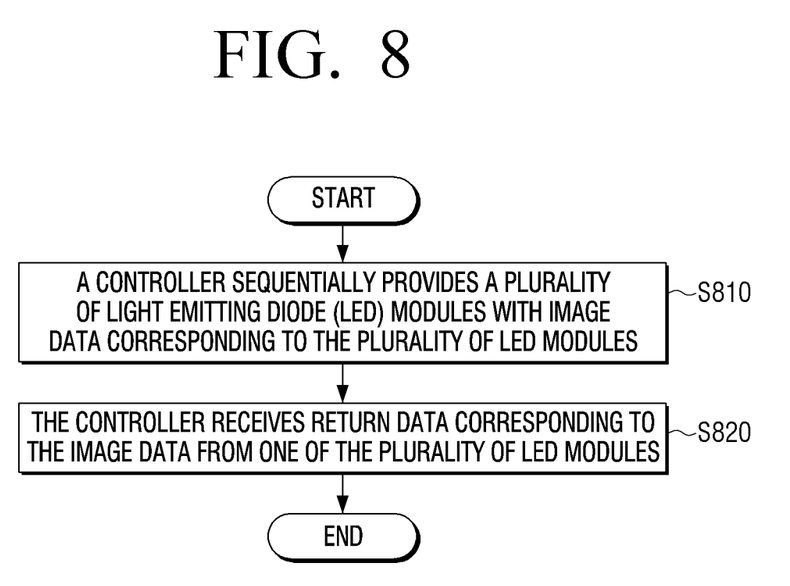
FIG. 8 is a flow chart for illustrating a method for controlling a display device according to an embodiment of the disclosure.

FIG. 8 is a flow chart for illustrating a method for controlling a display device according to an embodiment of the disclosure.

The controller may sequentially provide a plurality of light emitting diode (LED) modules with image data corresponding to the plurality of LED modules at operation S810.

Here, the plurality of LED modules may be modules including a plurality of micro light emitting diodes (LEDs). Here, the micro LEDs may be micro LEDs in a size of 10 to 100 micrometers (μm) of which length is ⅒ and area is 1/100 of a general light emitting diode (LED) chip.

The controller may sequentially provide a plurality of image data corresponding to each of the plurality of LED modules based on the arrangement order of the plurality of driving modules.

The controller may receive return data corresponding to the image data from one of the plurality of LED modules at operation S820.

Specifically, the controller may receive return data including the additional information obtained from the plurality of LED modules, and block return data including the image data.

Here, the additional information may be information including at least one of the error information, the temperature information, or the voltage information of the LEDs included in the plurality of LED modules.

According to an embodiment of the disclosure, the controller may turn on the switch located on a line wherein return data is transmitted during a predetermined time section, and receive return data including the additional information. Also, the controller may turn off the switch during the remaining time section, and block return data including the image data.

Specifically, the controller may include information on the time point of obtaining the additional information in the image data and transmit the image data, and perform a control such that the switch is turned on during a predetermined time section based on such information.

According to another embodiment of the disclosure, the controller may include a command for replacing at least some of the image data with the additional information obtained from the plurality of LED modules in the image data, and transmit the image data. Here, some of the additional information may include information on the LEDs wherein an event occurred, and the other may be dummy data.

In such return data, the image data 510 may not be included or only some of the image data 510 is included, and thus EMI that occurs in the process wherein the controller 130 receives return data may be reduced.

As detailed operations in each step were described above, detailed explanation in this regard will be omitted.

At least some components of the methods according to the aforementioned various embodiments of the disclosure may be implemented just by software upgrade, or hardware upgrade of a display device consisting of a conventional unit display module and/or a unit display module.

Meanwhile, the aforementioned various embodiments may be implemented in a recording medium that is readable by a computer or a device similar thereto, by using software, hardware or a combination thereof. In some cases, the embodiments described in this specification may be implemented as a processor itself. According to implementation by software, the embodiments such as procedures and functions described in this specification may be implemented as separate software modules. Each of the software modules may perform one or more functions and operations described in this specification.

Meanwhile, computer instructions for performing processing operations according to the aforementioned various embodiments of the disclosure may be stored in a non-transitory computer-readable medium. Computer instructions stored in such a non-transitory computer-readable medium make the processing operations according to the aforementioned various embodiments performed by a specific machine, when the instructions are executed by the processor of the specific machine.

The operations of a non-transitory computer-readable medium storing computer instructions for making a display device perform operations when the instructions are executed by the processor of the display device may include, an operation of a controller of sequentially providing a plurality of light emitting diode (LED) modules with image data corresponding to the plurality of LED modules and an operation of the controller of receiving return data corresponding to the image data. Specifically, the operations of a non-transitory computer-readable medium may include operations of a controller of receiving return data including additional information obtained from a plurality of LED modules, and blocking return data including the image data.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display device comprising:
   a plurality of light emitting diode (LED) modules;
   a plurality of driving modules configured to drive the plurality of LED modules; and
   a controller configured to sequentially provide the plurality of LED modules with image data corresponding to the plurality of LED modules, and receive return data corresponding to the image data,
   wherein the return data includes a first portion including additional information obtained from the plurality of LED modules and a second portion including the image data, and
   wherein the controller is configured to:
   perform a control to selectively receive the first portion of the return data including the additional information obtained from the plurality of LED modules and selectively block the second portion of the return data including the image data.

2. The display device of claim 1, further comprising:
   a switch provided on a connecting line between the controller and at least one of the plurality of driving modules,
   wherein the controller is configured to:
   turn on the switch during a predetermined time section to receive the first portion of the return data including the additional information, and turn off the switch during a remaining time section to block the second portion of the return data including the image data.

3. The display device of claim 2, wherein the controller is configured to:
   include information on a time point of obtaining the additional information in the image data and transmit the image data, and
   perform a control to turn on the switch during the predetermined time section based on the information.

4. The display device of claim 1, wherein the controller is configured to:
   include a command to replace at least some of the image data with the additional information obtained from the plurality of LED modules in the image data and transmit the image data.

5. The display device of claim 4, wherein some of the additional information includes information on an LED wherein an event occurred and a remaining information is dummy data.

6. The display device of claim 1, wherein the additional information includes at least one of error information, temperature information, or voltage information of LEDs included in the plurality of LED modules.

7. The display device of claim 1, wherein the controller is configured to:
   sequentially transmit image data corresponding to each of the plurality of LED modules based on an arrangement order of the plurality of driving modules.

8. The display device of claim 1, wherein the plurality of LED modules are modules including a plurality of micro light emitting diodes (LEDs).

9. A method for controlling a display device, the method comprising:
   sequentially providing, by a controller of the display device, a plurality of light emitting diode (LED) modules with image data corresponding to the plurality of LED modules; and
   receiving, by the controller, return data corresponding to the image data from one of the plurality of LED modules,
   wherein the return data includes a first portion including additional information obtained from the plurality of LED modules and a second portion including the image data, and
   wherein the receiving return data comprises:
   selectively receiving the first portion of the return data including the additional information obtained from the plurality of LED modules and selectively blocking the second portion of the return data including the image data.

10. The method of claim 9, wherein the receiving return data comprises:
   turning on a switch arranged on a line wherein the return data is transmitted during a predetermined time section to receive the first portion of the return data including the additional information, and turning off the switch during a remaining time section to block the second portion of the return data including the image data.

11. The method of claim 10, wherein the providing comprises:
   including information on a time point of obtaining the additional information in the image data and transmitting the image data, and
   the receiving return data comprises:
   performing a control to turn on the switch during the predetermined time section based on the information.

12. The method of claim 9, wherein the providing comprises:
   including a command to replace at least some of the image data with the additional information obtained from the plurality of LED modules in the image data and transmitting the image data.

13. The method of claim 12, wherein some of the additional information includes information on an LED wherein an event occurred and a remaining information is dummy data.

14. The method of claim 9, wherein the additional information includes at least one of error information, temperature information, or voltage information of LEDs included in the plurality of LED modules.

15. The method of claim 9, wherein the providing comprises:
   sequentially transmitting image data corresponding to each of the plurality of LED modules based on an arrangement order of a plurality of driving modules configured to drive the plurality of LED modules.

* * * * *